Dec. 6, 1938.   R. STUHLMACHER   2,138,987
MACHINE TOOL AND THE LIKE
Filed April 30, 1935   6 Sheets-Sheet 2

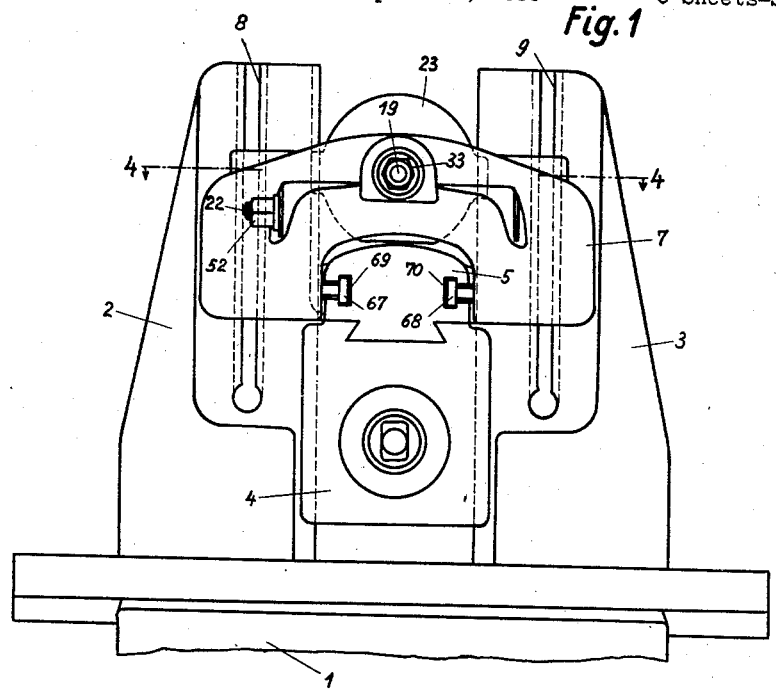

Inventor:
Richard Stuhlmacher
By Emil Bömelyche
Attorney

Dec. 6, 1938.     R. STUHLMACHER     2,138,987
MACHINE TOOL AND THE LIKE
Filed April 30, 1935     6 Sheets-Sheet 3
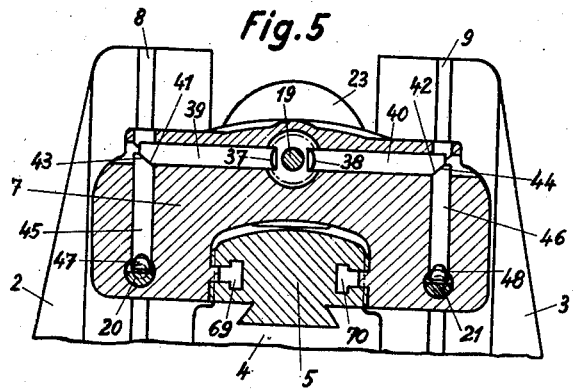
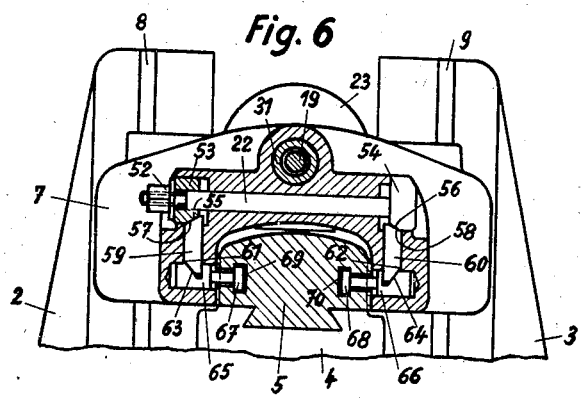
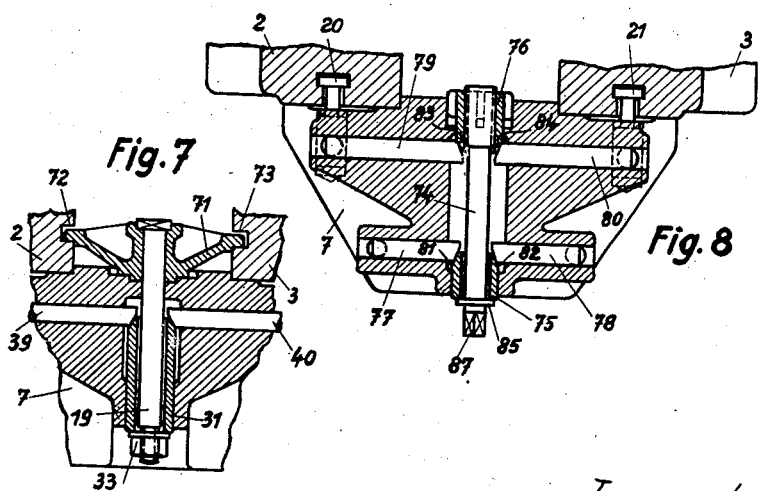
Inventor:
Richard Stuhlmacher
By Emil Bömelzehe
Attorney Dec. 6, 1938.     R. STUHLMACHER     2,138,987
MACHINE TOOL AND THE LIKE
Filed April 30, 1935     6 Sheets-Sheet 4

Inventor:
Richard Stuhlmacher
By Emil Bönnelycke
Attorney

Dec. 6, 1938.  R. STUHLMACHER  2,138,987
MACHINE TOOL AND THE LIKE
Filed April 30, 1935  6 Sheets-Sheet 5

Inventor:
Richard Stuhlmacher
By Emil Bönnelycke
Attorney

Inventor:
Richard Stuhlmacher
By Emil Bönnelyche
Attorney

Patented Dec. 6, 1938

2,138,987

UNITED STATES PATENT OFFICE 2,138,987

MACHINE TOOL AND THE LIKE

Richard Stuhlmacher, Siegmar in Saxony, Germany, assignor to Wanderer-Werke vorm. Winklhofer & Jaenicke Akt.-Ges., Schonau, near Chemnitz, Germany Application August 30, 1935, Serial No. 38,638
In Germany September 3, 1934

11 Claims. (Cl. 90—20.5)

This invention relates to machine tools, particularly a milling machine, provided with an overarm supported relative to the machine standard, and has for its object to attain great rigidity of the overarm and the parts carrying the tool or work in the most simple manner and to insure proper working of bulky jobs, the invention constituting an improvement over my Patent No. 2,030,481, issued February 11, 1936.

The invention accomplishes its end by supporting the overarm in several directions by a bracing member made in one piece and disposed between the standard and the overarm.

Figure 3:
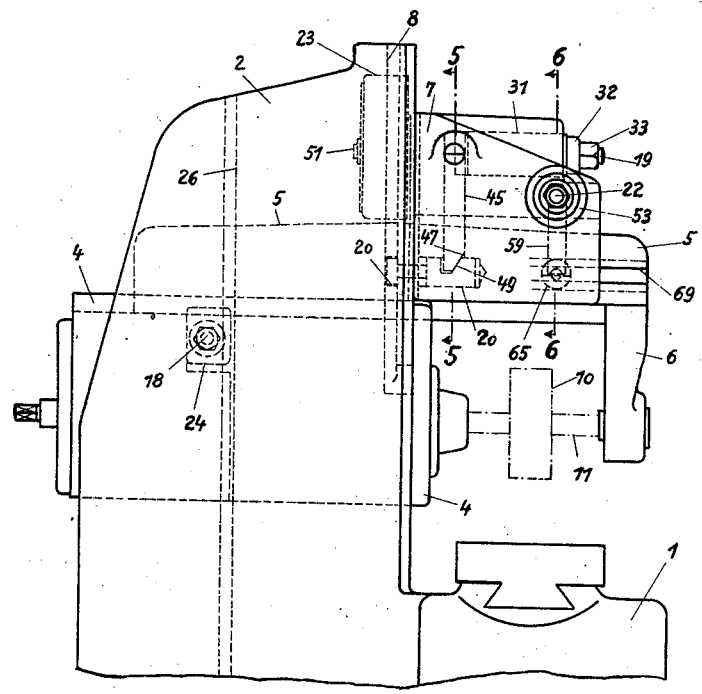
Figure 4:
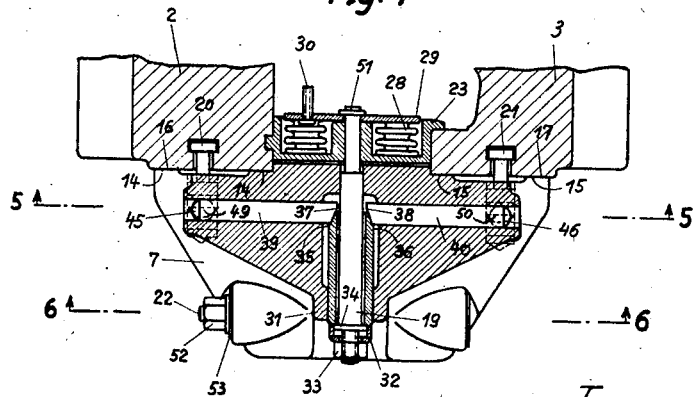
Figure 9:
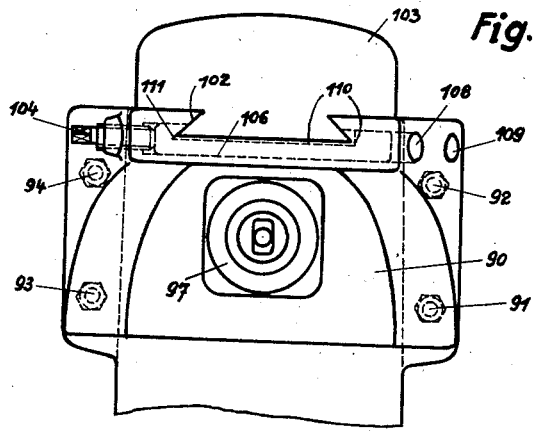
Figure 10:
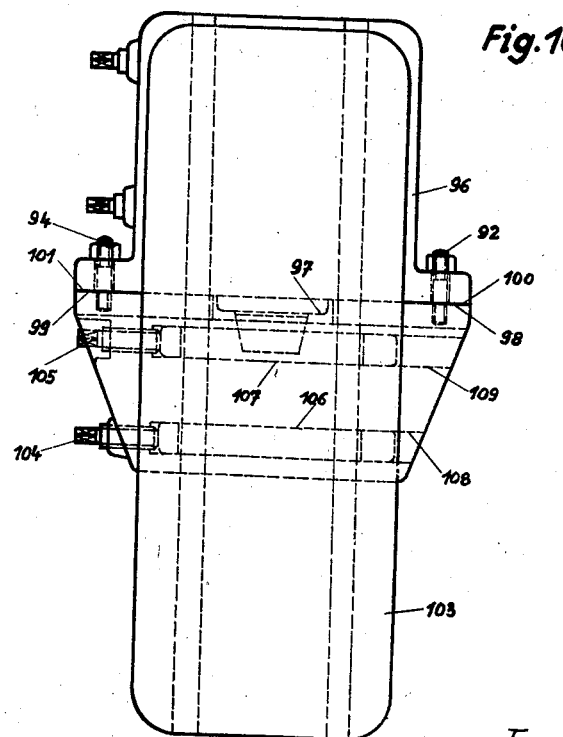
Figure 11:
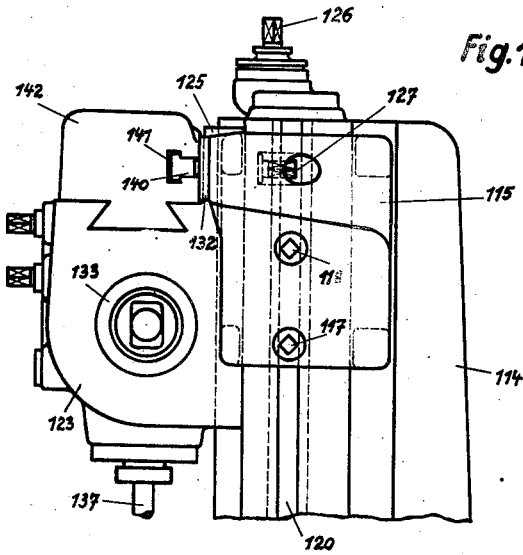
Figure 12:
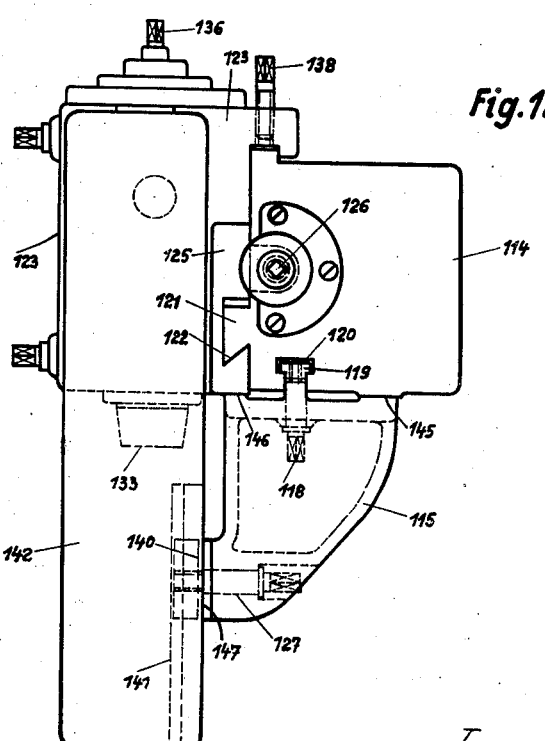
Figure 13:
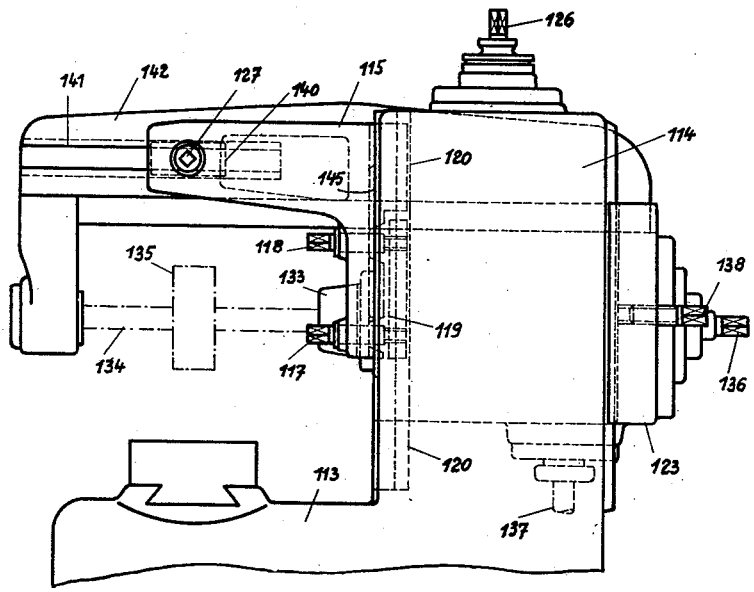

By way of example, several embodiments of the invention are illustrated in the accompanying drawings, in which Figure 1 is a front view of a surface milling machine with two standard members; Fig. 2, a top view of Fig. 1; Fig. 3, a side view thereof; Fig. 4, a sectional view of one form of a detail of the machine on the line 4—4, of Fig. 1; Figs. 5 and 6 are sectional views of further details on the lines 5—5 and 6—6, of Figs. 2, 3 and 4; Fig. 7 shows another form of a detail of the machine shown in Fig. 4; Fig. 8 shows still another form of a detail of the machine shown in Figs. 4 and 7; Fig. 9 is a front view of a column milling machine embodying the invention; Fig. 10, a top view of Fig. 9; Fig. 11, a front view of a single standard milling machine with a slide movable on the standard; Fig. 12, a top view of Fig. 11; Fig. 13, a side view thereof; and Fig. 14, a sectional view on an enlarged scale of a detail of this machine.

The embodiment of the invention illustrated in Figs. 1 to 8 represents a surface milling machine, in which a slide 4 carrying preferably a milling spindle 11 is guided between two parts 2 and 3 of the machine standard 1 so as to be displaceable in vertical direction. On the top of the milling slide 4, by means of a dovetailed connection, an overarm 5 is displaceably arranged, on the underside of which a bracket 6 for the front end of the milling spindle 11 carrying the cutter 10 is guided and can be clamped in position. Between the overarm 5 and the standard members 2, 3 a bracket-like bracing member 7 is provided which, according to the invention, multilaterally supports the overarm 5, preferably on its two sides in several directions.

The bracing member 7 can be pressed with its rear surfaces 14, 15 against the front surfaces 16, 17 of the standard members 2, 3, the surfaces 14, 15 being dimensioned so as to produce ample clamping or supporting surfaces. The bracing member 7 is guided in the slides 8 and 9 of the standard members 2, 3 and by the operation of a single tension member 19 can be pressed against the standard members 2, 3, owing to the tightening of the guides 20, 21 disposed in the slides 8, 9 by the member 19.

Clamping of the overarm 5 and the bracing member 7 is effected by the actuation of a fastening member 22 which need not be released during vertical adjustment of the slide 4.

For locking the milling slide 4 if no bracing member 7 is used for the overarm 5 as for instance during working of bulky jobs with a cutter head, a screw 18 is provided which acts upon the inclined surfaces 26, 27 of the standard members 2, 3 by means of the wedges 24, 25. To push back the overarm 5 entirely it is merely necessary to loosen the fastening member 22.

The device for clamping the bracing member 7 to the standard members 2, 3 as well as the overarm 5 in the bracing member 7 can be constructed in various ways.

If a pressure liquid, preferably oil under pressure, is available, the construction shown in Fig. 4 can preferably be chosen, which permits clamping of the overarm 5 automatically by hydraulic means or by hand. The tension member 19 is preferably disposed in the bracing member 7 and projects therefrom with its front part whereas its rear part is guided by a bridge member 23 serving for the reception of a pressure member 28. The bridge 23 is positioned between the standard members 2, 3 and, together with the covering plate 29, forms a casing for the pressure member 28 which can be expanded by means of a pressure liquid. On being relieved, the pressure member 28 assumes again its original shape, owing to its elastic properties.

The pressure liquid is fed to the pressure member 28 by a piping through the connection 30, the pressure member being either a metallic expansion member or a rubber pad, preferably consisting of several parts. The expansion of the pressure member 28 is utilized for displacing the tension member 19 which may have the form of a screw.

For further transmission of power the tension member 19 is provided with a sleeve-like intermediate member 31 which is put on the member 19 so as to leave an interstice and which is supported by the nut 33 of the tension member 19 by means of the cap 32. The tension member 19 is further fitted with a collar 34 which abuts against the sleeve-like intermediate member 31. On the end facing the pressure member 28 the intermediate member 31 possesses the bevelled faces 35, 36 which may also be conical and which cooperate with the inclines 37, 38 of the pressure parts 39, 40 which like the tension member 19 are positioned in the bracing member 7. As shown in Figs. 3, 4 and 5, the pressure parts 39, 40 have additional inclines 41, 42 which act upon the inclines 43, 44 of the clamping bolts 45, 46 vertically disposed relative to the pressure parts 39, 40. The clamping bolts 45, 46 have at their lower ends inclines 47, 48 which abut against the inclines 49, 50 of the guides 20, 21 acting as tensioning means. The portion of the guides 20, 21 lying in the slide 8 or 9 is T-shaped and, by means of internal thread, receives the other portion disposed in the bracing member 7.

When the pressure member 28 is subjected to the pressure of the pressure liquid, it will expand accordingly, and this expansion is transmitted by the covering plate 29 to the tension member 19 which, for instance with a head 51, extends behind the plate 29. The expansion of the pressure member 28 causes a longitudinal displacement of the tension member 19 and thus of the intermediate member 31 in the direction of the pressure member 28. Owing to this displacement of the intermediate member 31, the pressure parts 39, 40 are moved apart, so that the clamping bolts 45, 46 are caused to act upon the guides 20, 21 and bring about the tightening thereof. As a result, the bracing member 7 will hug with its rear faces 14, 15 the fronts 16, 17 of the standard members 2, 3 and thereby clamp the overarm 5 in position.

If the tension member 19 is actuated by hand by tightening the nut 33, the intermediate member 31 will move in longitudinal direction relative to the tension member 19, as the nut 33 is pressed against the cap 32. Owing to the unscrewing of the tension member 19, the intermediate member 31 will then be displaced in the direction of the pressure member 28 in such a way that the tension member 19, with respect to the pressure parts 39, 40, the clamping bolts 45, 46 and the guides 20, 21, will have the same effect as during the hydraulic operation described.

As can be seen particularly in Fig. 5, the guides for the pressure parts 39, 40 in the bracing member 7 and the clamping bolts 45, 46 are made continuous, and it is therefore possible to insert the pressure parts and bolts in their guides from without. The guides can then be closed by screw plugs.

The clamping of the overarm 5 to the bracing member 7 by means of the fastening member 22 is shown in Fig. 6. In the construction shown, the fastening member 22 consists substantially of a screw which during tightening of the nut 52 is displaced in longitudinal direction. The fastening member 22 comprises further the wedges 53, 54 which are attached to it. The inclines 55, 56 of the wedges 53, 54 act upon corresponding inclines 57, 58 of the intermediate members 59, 60 which, by their inclines 61, 62 exert pressure upon the inclines 63, 64, which face them, of the draw bolts 65, 66. The fastening member 22 with the wedges 53, 54 as well as the intermediate members 59, 60 and the draw bolts 65, 66 are accommodated in the bracing member 7, the bolts 65, 66 being connected with the slide ways 67, 68 in the guides 69, 70 of the overarm 5.

When the fastening member 22 is displaced in longitudinal direction by the tightening of the nut 52, this motion will be transmitted by the wedges 53, 54 to the intermediate members 59, 60 which in turn act upon the draw bolts 65, 66 which are thus moved and effect a double-sided bracing of the overarm 5 and the bracing member 7.

The form of clamping device shown in Fig. 7 is suited for the purely mechanical clamping of the overarm 5 by manual operation of the tension member 19. In this case, instead of a pressure member 28 according to Fig. 4, a correspondingly recessed tensioning piece 71 is provided and so constructed that with its outer edge it is located in the clearances 72, 73 of the standard members 2, 3. The construction of the power transmitting means, such as the tension member 19, the intermediate member 31, the pressure parts 39, 40 and the other members resembles that shown in Fig. 4.

For simultaneously clamping the bracing member 7 to the standard members 2, 3 and the overarm 5 the construction according to Fig. 8 is provided with a single tension member 74 which carries the two sleeves 75, 76, the sleeve 75 cooperating with the pressure parts 77, 78 for influencing the overarm 5 and the sleeve 76 coacting with the pressure parts 79, 80 for adjusting the bracing member 7. The pressure parts 77, 78 and 79, 80 are actuated during the longitudinal displacement of the tension member 74 by means of the inclines 81, 82 on the sleeve 75 and inclines 83, 84 on the sleeve 76, the inclines being replaceable by conical surfaces. The sleeve 75 is attached to the tension member 74 so as to leave an interstice and is supported by a collar 85 thereof, whereas the sleeve 76 is connected with the tension member 74 by means of a thread. In this way it becomes possible, in case of inaccuracies due to irregularities in the construction of the transmission members, to clamp the bracing member 7 to the overarm 5 and the standard members 2, 3 also laterally and successively without interfering with safe clamping.

This clamping device can be manually operated by tightening the square head 87 of the tension member 74. The other parts for transmitting power from the tension member 74 to the bracing member 7 or the overarm 5 are constructed like those described in connection with the constructions previously mentioned.

The clamping device can further be constructed so that the pressure parts are arranged radially with respect to a common center and are operated from a common tension member, the pressure members being also displaced by wedge effects in longitudinal direction to initiate the clamping of the overarm 5 and the bracing member 7. In a construction of this kind force is transmitted as described.

Another construction of the clamping device comprises pressure parts in the form of members resembling balance beams and engaging the ends of the clamping bolts which are pressed together when the wedges or similar means are tightened.

In all embodiments of the invention the wedges or similar means employed for the purpose stated can be provided with means for reducing friction.

The second embodiment of the invention according to Figs. 9 and 10 represents a milling machine having a standard 96 and a headstock 97 non-adjustably disposed in vertical direction. By means of the screws 91, 92, 93, 94 a bracing member 90, which is a single piece, is fixably secured to the standard 96, the member 90 hugging with its faces 98, 99 the lateral faces 100, 101 of the standard 96. The member 90 has a continuous guide 102, preferably of dovetailed cross section, for receiving the overarm 103 being in its lower part also preferably of dovetailed cross section, so that the overarm 103 is supported by the bracing member 90 both from below and the side.

For clamping the bracing member 90 to the overarm 103 the fastening members 104, 105, which may be screws, are provided which act upon the tension parts 106, 107 which are disposed in the continuous bores 108, 109 of the bracing member 90. Each tensioning part 106, 107 has a clearance 110, one boundary surface of which is inclined, the inclination of this surface corresponding to that of the oblique side face of the dovetailed portion of the overarm 103 facing it. When the parallel tensioning pieces 106, 107 disposed on the same level are tightened by the turning of the fastening members 104, 105, the inclined boundary surface of the respective tensioning part 106 or 107 will hug the corresponding surface of the overarm 103 and thus clamp the latter to the bracing member 90.

The construction according to Figs. 11 to 14 represents a milling machine with a one-part standard 114 carried by the machine base 113. A slide 123 is vertically displaceable on the standard, and the overarm 142 disposed on the slide 123 is supported in several directions by a one-part bracing member 115 between the standard 114 and the overarm 142. The supporting faces 145, 146, 147 of the bracing member 115 with respect to the standard 114 or the overarm 142 are preferably arranged in planes forming a right angle, so that the overarm 142 is protected against rotation both towards the right and left (Fig. 12). This angular construction of the brace 115 and the detachable fastening of the latter by tensioning means relative to the standard 114 bring it about that when the bracing member 115 is fixed relative to the standard 114, the slide 123 is simultaneously firmly connected with the standard also.

The tensioning means, e. g. screws, are connected with guides 119 which are arranged in a continuous groove 120 of the standard 114. The latter has also a guide 121 provided with a wedge-like surface 122 on which the carriage 123 is guided during its vertical motion. The slide 123 has a projecting portion 125 for insuring accurate and preferably adjustable guiding thereof. For adjusting the slide 123 in vertical direction serves a screw 126. The slide 123 may further be constructed so that the supporting surface 146 of the bracing member 115 can be pressed against it, whereby during clamping of the bracing member 115 to the standard 114 the slide 123 is fixed also with respect to the standard.

Figure 14:
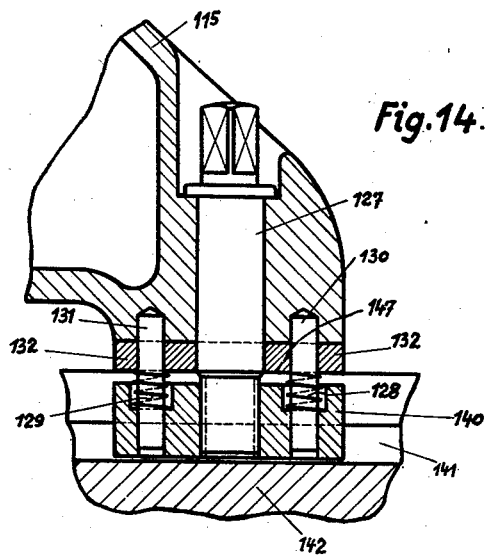

For fixing the overarm 142 to the bracing member 115 a fastening member 127, such as a screw, is provided, though of course several screws may be used also. The screw 127 need not be unscrewed during the vertical adjustment of the slide 123. Besides the fastening member 127, as shown in Fig. 14, several guiding pins 130, 131, cushioned by the springs 128, 129, and an intermediate layer 132 serving as sliding face for the relative displacement of the bracing member 115 and the overarm 142 are provided on the bracing member 115. The pins 130, 131 engage a guide 140 which during adjustment of the overarm 142 is guided in the T-shaped groove 141 of the overarm 142 which is disposed in a dovetailed guide on the slide 123.

The slide 123 is provided in usual manner with a chuck 133 for the tool carrier or the tool itself, in the present instance for the spindle 134 carrying a cutter 135, and the chuck 133 is fixed by means of the screw 136. Drive comes from the shaft 137, so that, in the construction shown, the bracing member 115 connects the overarm 142 with the standard 114 and also fixes the slide 123. If the tool with the slide 123 is to be adjusted vertically, it is only necessary to loosen the tensioning means 117, 118. The slide 123 further receives a screw 138 which serves for clamping it if no bracing member 115 is used.

I claim:—

1. A machine tool, particularly a milling machine, comprising a machine standard, a working spindle, means for supporting the working spindle, an overarm, a one-part bracing member for supporting said overarm in a number of directions relative to said standard and embracing it from a number of sides, a tension member for fixing the overarm relative to the bracing member and the bracing member relative to the standard, a plurality of guide members for connecting the bracing member with the standard, and a plurality of wedge-like intermediate members cooperating with the tension member for fixing said guide members.

2. A machine tool, particularly a milling machine, comprising a machine standard, a working spindle, means for supporting the working spindle, an overarm, a one-part bracing member for supporting said overarm in a number of directions relative to said standard and embracing it from a number of sides, a tension member for fixing the overarm relative to the bracing member and the bracing member relative to the standard, a plurality of guide members for connecting the bracing member with the overarm, and a plurality of wedge-like intermediate members cooperating with the tension member for fixing said guide members.

3. A machine tool, particularly a milling machine, comprising a machine standard, a working spindle, means for supporting the working spindle, an overarm, a one-part bracing member for supporting said overarm in a number of directions relative to said standard and embracing it from a number of sides, a tension member for fixing the overarm relative to the bracing member and the bracing member relative to the standard, a plurality of guide members for connecting the bracing member with the overarm, and a plurality of wedge-like intermediate members cooperating with the tension member for fixing said guide members, said tension member and intermediate members being arranged inside the bracing member.

4. A machine tool, particularly a milling machine, comprising a machine standard, a slide arranged on the machine standard, said slide carrying a working spindle, an overarm carried and guided by the slide and projecting freely from the standard, means for supporting the working spindle, said means being arranged at the projecting part of the overarm, a one part bracing member for supporting the overarm on the standard, said one part bracing member having guides adapted to connect it with the standard and the overarm, a guide on said standard being adapted to engage the corresponding guide of the bracing member, and a wedge-like guide on the slide pressed against a corresponding guide on said standard by means of one of the guides on the bracing member when the bracing member is being fixed.

5. A machine tool, particularly a milling machine, comprising a machine standard, a slide arranged on the machine standard, said slide carrying a working spindle, an overarm carried and guided by the slide and projecting freely from the standard, means for supporting the working spindle, said means being arranged at the projecting part of the overarm, a one part bracing member for supporting the overarm on the standard, said one part bracing member being connected with the standard and the overarm, and a fastening means for clamping the overarm to the bracing member from both sides.

6. A machine tool, particularly a milling machine, comprising a machine standard, a slide arranged on the machine standard, said slide carrying a working spindle, an overarm carried and guided by the slide and projecting freely from the standard, means for supporting the working spindle, said means being arranged at the projecting part of the overarm, a one part bracing member for supporting the overarm on the standard, said one part bracing member being connected with the standard and the overarm, and a manually operated tension means for fixing the bracing member relative to the standard.

7. A machine tool, particularly a milling machine, comprising a standard, an overarm for the standard and having a projecting portion between the standard and the overarm, said overarm, projecting portion, and standard each having a supporting face, and a one-part bracing member secured to the standard and overarm for rigidly supporting the overarm from the standard, said bracing member having three surfaces contacting with the three faces on the standard, projecting portion and the overarm.

8. A machine tool according to claim 7, in which the bracing member is formed as a substantially right-angled triangle as viewed from the top in which the two sides of the right angle include the three contacting surfaces.

9. A machine tool, particularly a milling machine, comprising a machine standard, a spindle carrier, a horizontally arranged spindle, means for holding the spindle, an overarm, a one part bracing member for securing the overarm to the spindle carrier, wedge-like guides arranged parallel to the spindle to clamp the bracing member with the standard, and wedge-like guides horizontally arranged and at right angles to the first-mentioned wedge-like guides to clamp the bracing member with the overarm.

10. A machine tool, particularly a milling machine, comprising a machine standard, a slide arranged on the machine standard, said slide carrying a working spindle, an overarm carried and guided by the slide and projecting freely from the standard, means for supporting the working spindle, said means being arranged at the projecting part of the overarm, and a one part bracing member for supporting the overarm on the standard, said one part bracing member being positively connected with the standard and the overarm and being disposed between the standard and overarm, and said bracing member having supporting faces forming a right angle relative to the standard and the overarm.

11. A machine tool, particularly a milling machine, comprising a machine standard, a slide arranged on the machine standard, said slide carrying a working spindle and being displaceably arranged relative to the standard, an overarm carried and guided by the slide and projecting freely from the standard, means for supporting the working spindle, said means being arranged at the projecting part of the overarm, and a one part bracing member for supporting the overarm on the standard, said one part bracing member being positively connected with the standard and the overarm and being detachably connected with the standard and the supporting faces thereof forming a right angle relative to the standard and the overarm.

RICHARD STUHLMACHER.